United States Patent
Herrmann et al.

(10) Patent No.: US 11,799,109 B2
(45) Date of Patent: Oct. 24, 2023

(54) FUEL CELL SYSTEM AND METHOD FOR OPERATING A FUEL CELL SYSTEM

(71) Applicant: Technische Universität München, Munich (DE)

(72) Inventors: Stephan Herrmann, Munich (DE); Hartmut Spliethoff, Olching (DE); Matthias Gaderer, Neukirchen (DE)

(73) Assignee: Technische Universität München, Munich (DE)

(*) Notice: Subject to any disclaimer, the term of this patent is extended or adjusted under 35 U.S.C. 154(b) by 93 days.

(21) Appl. No.: 16/610,470

(22) PCT Filed: Apr. 26, 2018

(86) PCT No.: PCT/EP2018/060782
§ 371 (c)(1),
(2) Date: Nov. 1, 2019

(87) PCT Pub. No.: WO2018/202551
PCT Pub. Date: Nov. 8, 2018

(65) Prior Publication Data
US 2020/0153013 A1    May 14, 2020

(30) Foreign Application Priority Data
May 2, 2017 (EP) .................. 17169085

(51) Int. Cl.
*H01M 8/0612* (2016.01)
*C01B 3/48* (2006.01)
(Continued)

(52) U.S. Cl.
CPC ............ *H01M 8/0618* (2013.01); *C01B 3/48* (2013.01); *H01M 8/04022* (2013.01);
(Continued)

(58) Field of Classification Search
CPC .......... H01M 8/0618; H01M 8/04022; H01M 8/04097; H01M 8/04753; H01M 8/0637;
(Continued)

(56) References Cited

U.S. PATENT DOCUMENTS 5,034,287 A  7/1991 Kunz
5,541,014 A * 7/1996 Micheli ............ H01M 8/04089
                                                      429/415
(Continued)

FOREIGN PATENT DOCUMENTS

CN     105960729 A    9/2016
JP     2008-204783 A  9/2008
(Continued)

OTHER PUBLICATIONS

Nov. 14, 2019, International Preliminary Report on Patentability from The International Bureau of WIPO in PCT/EP2018/060782, which is the international application to this U.S. national phase application.
(Continued)

*Primary Examiner* — Matthew J Merkling
(74) *Attorney, Agent, or Firm* — Kolisch Hartwell, P.C.

(57) ABSTRACT

A fuel cell system comprising at least one fuel cell arranged for a reformation of a hydrocarbon and a hydrocarbon generation unit connected to an anode outlet of the fuel cell for generating the hydrocarbon from carbon monoxide and hydrogen included in a partially unconverted exhaust stream of the anode outlet of the fuel cell, where the fuel cell is thermally decoupled from the hydrocarbon generation unit so that the exothermal hydrocarbon generation reaction and the endothermal reformation reaction proceed without one reaction thermally interfering the other.

20 Claims, 3 Drawing Sheets

Figure 1:
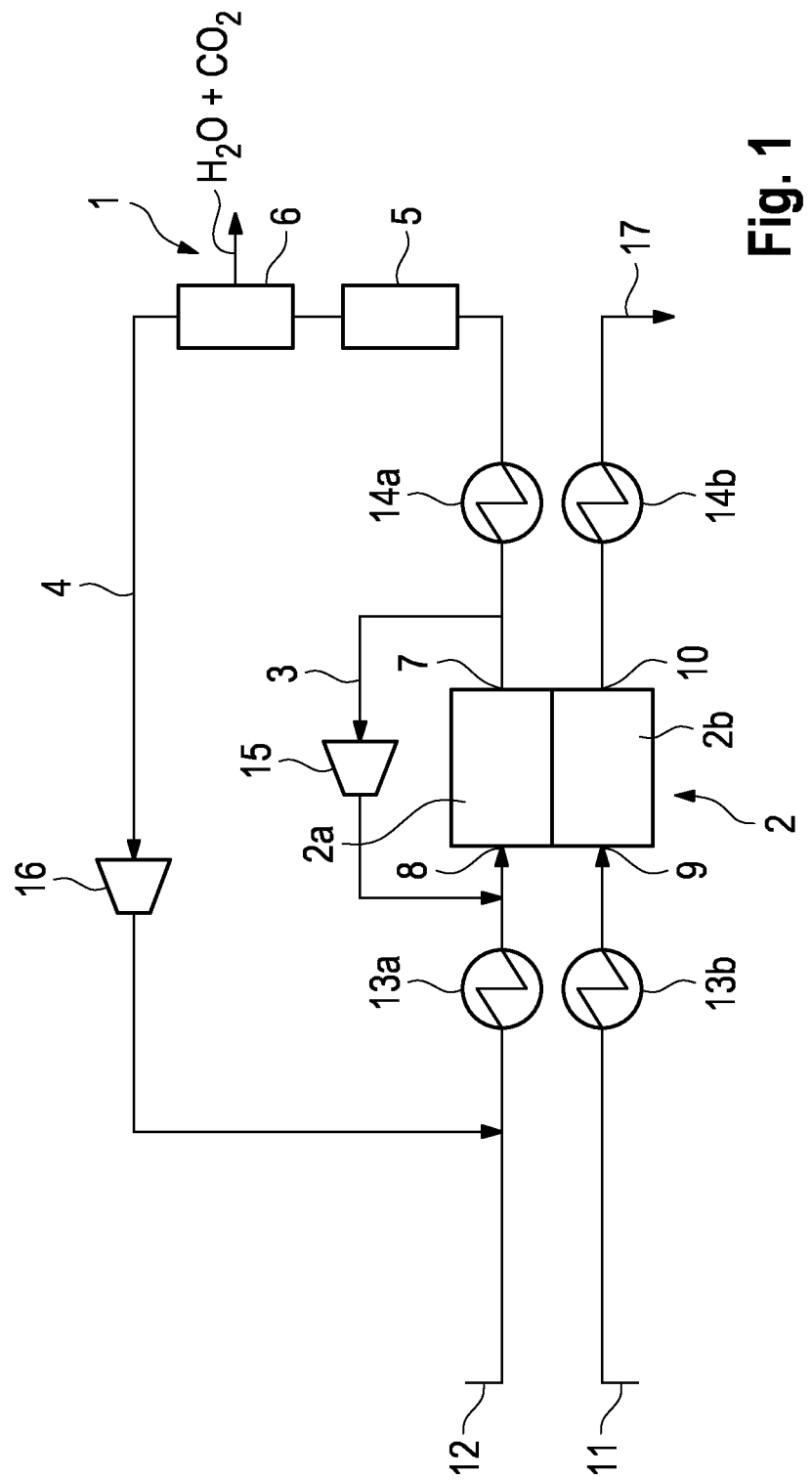

(51) Int. Cl.
*H01M 8/04014* (2016.01)
*H01M 8/04089* (2016.01)
*H01M 8/04746* (2016.01)
*H01M 8/0637* (2016.01)
*H01M 8/18* (2006.01)

(52) U.S. Cl.
CPC ... *H01M 8/04097* (2013.01); *H01M 8/04753* (2013.01); *H01M 8/0637* (2013.01); *H01M 8/186* (2013.01); *C01B 2203/0283* (2013.01); *C01B 2203/067* (2013.01); *C01B 2203/0822* (2013.01)

(58) Field of Classification Search
CPC .. H01M 8/186; C01B 3/48; C01B 2203/0283; C01B 2203/067; C01B 2203/0822
See application file for complete search history.

(56) References Cited

U.S. PATENT DOCUMENTS

| | | | | |
|---|---|---|---|---|
| 8,349,504 | B1 * | 1/2013 | Radovich | C01B 3/48 429/426 |
| 2004/0224193 | A1 * | 11/2004 | Mitlitsky | H01M 8/04052 429/411 |
| 2007/0234640 | A1 * | 10/2007 | Jia | C10J 3/80 48/127.9 |
| 2010/0047641 | A1 * | 2/2010 | Jahnke | H01M 8/0612 429/415 |
| 2010/0178574 | A1 | 7/2010 | Valensa | |
| 2012/0178833 | A1 * | 7/2012 | Clomburg, Jr. | C07C 1/041 518/711 |
| 2014/0272641 | A1 * | 9/2014 | Berlowitz | H01M 8/0687 429/420 |
| 2016/0355933 | A1 | 12/2016 | Diethelm et al. | |
| 2021/0218044 | A1 * | 7/2021 | Jahnke | B01D 53/326 |

FOREIGN PATENT DOCUMENTS

| | | |
|---|---|---|
| JP | 2018-519617 A | 7/2018 |
| KR | 10-2014-0057103 A | 5/2014 |
| WO | 2013178430 A1 | 12/2013 |
| WO | 2016156374 A1 | 10/2016 |

OTHER PUBLICATIONS

European Patent Office, Extended European Search Report in European Patent Application No. 17169085.2-1360, dated Sep. 13, 2017, 7 pages.
Aug. 8, 2018, Written Opinion of the International Searching Authority from the European Patent Office in PCT/EP2018/060782, which is the international application to this U.S. national phase application.
Aug. 8, 2018, International Search Report of the International Searching Authority from the European Patent Office in PCT/EP2018/060782, which is the international application to this U.S. national phase application.
Japanese Patent Office, Office Action regarding Japanese Patent Application No. 2019-558505, dated Oct. 27, 2020, 20 pages.
Korean Intellectual Property Office, Office Action regarding Korean Patent Application No. 10-2019-7035529, dated Jan. 14, 2021, 9 pages.
Canadian Intellectual Property Office, Office Action regarding Canadian Patent Application No. 3,061,820, dated Sep. 14, 2021, 4 pages.
European Patent Office, Examination Report regarding European Patent Application No. 17169085.2, dated Nov. 7, 2019, 3 pages.
Canadian Intellectual Property Office, Office Action regarding Canadian Patent Application No. 3,061,820, dated Feb. 25, 2021, 3 pages.
The State Intellectual Property Office of the People's Republic of China, Notice of First Office Action regarding Chinese Patent Application No. 201880029232.6 dated Feb. 21, 2022, 22 pages.

* cited by examiner

FUEL CELL SYSTEM AND METHOD FOR OPERATING A FUEL CELL SYSTEM

The present invention concerns a fuel cell system having an increased total efficiency and a method for operating a fuel cell system with increased total efficiency.

Fuel cell systems, especially high temperature fuel cell systems with an operation temperature of around 600-800° C., are widely used in the prior art for generating electric power produced by the redox reaction of a fuel stream and an oxidant stream. Since fuel cells produce electric power directly, they are not limited by the thermodynamic restrictions of the Carnot process. Fuel cell systems known in the prior art have a fuel utilization of about 80 to 90% since higher fuel utilization values lead to an anode degradation due to the absence of hydrogen, and the water on the anode outlet of the fuel cell does not provide any voltage and therefore no electric power. However, fuel cell systems with a fuel utilization of 80 to 90% have a lower total efficiency and generate up to 15-30% high temperature waste heat. Another reason for the lower total efficiency is that residual and unconverted fuel is normally burned. In order to increase the fuel utilization to up to 100% without the mentioned drawbacks of e.g. anode degradation, the unconverted residual fuel can be converted to hydrogen in a water gas shift reaction before it is recirculated into the fuel cell. Thus, a theoretical total efficiency of 80% can be achieved. Nevertheless, the heat released by the fuel cell has to be dissipated from the fuel cell. Therefore, high mass flows of the oxidant stream, e.g. air, have to be used which generates additional exergetic losses for the fuel cell, since a heat amount having 100° C. is released due to the heat transfer to the outside of the fuel cell and the total efficiency drops to values below 74%. According to Schlitzberger (SCHLITZBERGER Christian, Solid Oxide Fuel Cell (SOFC)-Systeme mit integrierter Reformierung bzw. Vergasung von Kohlenwasserstoffen, Berichte aus der Energietechnik, 2012, Aachen: Shaker), a sufficient fuel cell cooling without using an increased mass flow of the oxidant stream can be achieved by integrating the endothermal reformation reaction of methane into the fuel cell system, wherein said unit is included in a unit upstream to the fuel cell and coupled thereto. Only a total efficiency of 70% can be achieved at 90% fuel utilization in said system, since the low fuel concentration at the outlet and the high water amount at the outlet decrease the internal fuel cell efficiency, wherein the fuel utilization value has to be kept at this value for the reasons mentioned above (e.g. anode degradation). The heat loss to an extent of 30% results from the heat loss of the fuel cell itself, i.e. the heat amount used for the endothermal reformation reaction and the non-electrochemical combustion of the fuel.

Starting from this prior art it is an object underlying the present invention to provide a fuel cell system with a reduced heat loss, i.e. an increased total efficiency. Moreover, it is an object of the present invention to provide a method of operating a fuel cell system with increased fuel utilization values and an increased total efficiency.

The object is achieved by a fuel cell system of claim 1. The inventive fuel cell system comprises at least one fuel cell arranged for a reformation of hydrocarbons and a hydrocarbon generation unit connected to an anode outlet of the fuel cell for generating hydrocarbons out of a partially unconverted exhaust stream of the anode outlet of the fuel cell, wherein the fuel cell is thermally decoupled from the hydrocarbon generation unit.

The fuel cell can be of any kind, e.g. solid oxide fuel cell (SOFC) or molten carbonate fuel cell (MCFC) and the like. The electrode materials, the membrane materials and the electrolyte materials of the fuel cell of the present invention comprise any technical means known in the prior art. In particular, the function of the fuel cell is the generation of electric power by reacting a fuel stream with an oxidant stream, wherein the oxidant stream usually comprises an oxygen containing gas mixture, e.g. air. The oxidant stream is supplied to a cathode inlet of the fuel cell via conventional technical means. Different types of fuel cells may require the addition of a further additive. When using e.g. a MCFC carbon dioxide is additionally supplied to the fuel cell oxidant stream. The fuel stream is supplied to an anode inlet of the fuel cell via a fuel stream anode inlet conduit, e.g. in form of gas. Suitable fuel streams are e.g. biogas and/or synthesis gas and/or natural gas and/or other gases or gas mixtures which are suitable to operate fuel cells. Synthesis gas can be produced by processes known in the art, like e.g. gasification and/or methanation and/or the Fischer-Tropsch synthesis. The fuel stream can further comprise components like methane, ethane, propane or other hydrocarbons, carbon monoxide, hydrogen, methanol and ethanol and other long chain alcohols or a combination thereof. The exhaust stream of the anode outlet of the fuel cell can include unconverted reactants, like e.g. carbon monoxide, hydrogen and methane and other gases as mentioned above. The exhaust stream of the anode outlet of the fuel cell further can comprise fully converted products like e.g. water and carbon dioxide. Partially converted reactants like e.g. methanol or acetic acid or formaldehyde are also possible. An exhaust stream of a cathode outlet of the fuel cell may comprise fully converted reactants like water and unconverted reactants like e.g. oxygen and inert gases like e.g. nitrogen.

The fuel cell system comprises at least one fuel cell. Depending on the amount of electrical energy needed, a plurality of fuel cells can be stacked, e.g. in a series connection for a high electric power output. Reactants and products can be transported in the inventive fuel cell system by any suitable technical means, preferably by conduits. All conduits used in the inventive fuel cell system may be suitable transport systems like pipelines, hoses or tubings appropriately configured to transport the respective gaseous or liquid streams.

The fuel cell of the present invention is also arranged for a reformation of hydrocarbon fuels (e.g. methane, further on for simplicity/vividness used as non-exclusive example for the reformation reaction) in its anode side of the fuel cell. This is an endothermal reaction which can e.g. proceed over the following equations I and II:

$$CH_4 + H_2O \rightarrow CO + 3H_2 \quad (I)$$

$$CH_4 + CO_2 \rightarrow 2CO + 2H_2 \quad (II)$$

Thus, the reformation of methane can be conveniently carried out in the fuel cell by feeding a methane stream and a carbon dioxide stream and/or a water stream to the anode inlet of the fuel cell. The methane, carbon dioxide and water streams can be introduced into the fuel cell by any suitable known technical means. In the reformation reaction the heat dissipation of the fuel cell proceeds over the endothermal reformation of methane which can be considered as an internal cooling or a heat sink. Thus, essentially no cooling on the outside of the fuel cell or by an increased mass flow of the oxidant stream is necessary. Therefore, the oxidant stream can be adjusted to low mass flows and there is less or no additional heat loss, since there is no need of having higher mass flows. Therefore, the total efficiency of the fuel cell system is increased and the heat dissipation can be regulated independently of the mass flow of the oxidant stream.

The term heat loss, whenever used in the description, defines the amount of energy resulting from e.g. internal loss of the fuel cell due to electrochemical processes, internal resistance, friction loss of the gas stream, reaction heat in the fuel cell system that cannot be used as electrical energy and is therefore released as heat. Therefore, the heat loss mainly occurs in the fuel cell. Further, negligible amounts of heat loss can occur in the different units of the fuel cell system. Thus, the total efficiency of the fuel cell system is reduced by the degree of the heat loss. In other words, the total efficiency of the fuel cell system is the relation of the energy of the chemical reaction usable as electrical energy and the total energy released by the chemical reaction. In addition, the heat loss occurring in the fuel cell is chemically stored in the products of the reformation reaction which leave the fuel cell unconverted. Furthermore, the reformation reaction can also be carried out by adding further hydrocarbons or other hydrocarbon bond containing reactants, as described above, to the hydrocarbon stream and/or the water stream and/or the carbon dioxide stream.

The fuel cell system further comprises a hydrocarbon generation unit for generating a hydrocarbon from carbon monoxide and hydrogen included in a partially unconverted exhaust stream component. The hydrocarbon generation unit is connected to the anode outlet of the fuel cell. Components of the unconverted exhaust stream as denoted herein are on the one hand components, like carbon monoxide and hydrogen, entering the anode on the inlet and which are not converted in the fuel cell and exit the anode outlet. On the other hand, components like carbon monoxide and hydrogen which are produced during the reformation reaction of hydrocarbon and are not further oxidized in the fuel cell and exit the anode outlet, also fall within the definition of the term "unconverted exhaust stream". The connection of the hydrocarbon generation unit and the fuel cell is possible by conventional means like a conduit or a conduit which includes further operations. The hydrocarbon generation unit can be any hydrocarbon generation unit known in the art. Hydrocarbon generation is an exothermal reaction wherein heat is typically released at temperatures of 300° C. to 600° C. In the hydrocarbon generation unit, a partially unconverted exhaust stream resulting from e.g. the reformation reaction can be converted into the hydrocarbon. Thus, the chemical energy, i.e. a part of the heat loss of the fuel cell, stored in the products of the reformation reaction which were not further converted, e.g. CO and $H_2$, is transported out of the fuel cell and released as heat in the hydrocarbon generation unit during the exothermal hydrocarbon generation reaction. Thus, an efficient further use of a part of the heat loss is possible by common energy conversion techniques i.e. a further increase of the total efficiency of the fuel cell system is obtainable.

The hydrocarbon generation unit is thermally decoupled from the fuel cell. Therefore, the exothermal hydrocarbon generation reaction and the endothermal reformation reaction proceed independently from each other which enables a proper reaction control, e.g. of the reaction equilibrium, of each reaction without one reaction thermally interfering the other, which also results in a decreased heat loss, and thus, in an increased total efficiency of the fuel cell system.

In the inventive fuel cell system, electric power and energy can be produced in a highly efficient manner. Only electrochemical conversion takes place and combustion reactions, which are commonly used in prior art fuel cell systems and produce major exergy destruction, are omitted. The overall heat loss can be reduced by several features. Due to the reformation reaction in the fuel cell, this endothermic reaction provides a heat sink and dissipates the heat of the fuel cell system. Therefore, the cooling operation of the fuel cell is independent of the oxidant stream and therefore the heat loss is decreased. Furthermore, a hydrocarbon generation unit connected to the anode outlet of the fuel cell contributes to a decreased heat loss by generating the hydrocarbon out of the products of the reformation reaction which have not been further converted in the fuel cell. This exothermal reaction releases a part of the heat loss of the fuel cell. This heat loss can be used by simple energy conversion techniques in order to further increase the total efficiency of the fuel cell system. The thermal decoupling of the hydrocarbon generation unit further contributes to a higher total efficiency and a better heat balance of the fuel cell system since the exothermal hydrocarbon generation and the endothermal reformation do not directly interfere with each other.

The sub-claims contain advantageous embodiments of the present invention.

According to a preferred embodiment of the inventive the fuel cell system, the hydrocarbon is methane and the hydrocarbon generating unit is a methanation unit. This helps to further increase the total efficiency of the fuel cell.

In a preferred embodiment of the present invention the fuel cell system comprises at least one separation unit which is arranged downstream to the hydrocarbon generation unit and connected thereto to separate non-combustible exhaust stream components, especially water and carbon dioxide. The separation unit can be anyone which is suited to separate non-combustible exhaust stream components by their physical and/or chemical characteristics. Hydrocarbon in good purity for further processes or for the storage can be obtained by the separation unit.

According to a further advantageous embodiment of the inventive fuel cell system, the hydrocarbon generation unit of the fuel cell system is connected to a hydrocarbon recycling conduit which is connected to an anode inlet of the fuel cell. The concentration of the hydrocarbon recycled into the anode inlet of the fuel cell controls the magnitude of the endothermal reformation reaction and the electrochemical combustion reaction in the fuel cell. Thus, an excellent control of the heat dissipation of the fuel cell can be achieved. Furthermore, the fuel utilization can be increased over 90% and almost up to 100% over the hydrocarbon recycling stream via the hydrocarbon recycling conduit. If aging of the fuel cell has to be compensated, which produces additional heat due to irreversibilities in the fuel cell, the hydrocarbon recirculation can be increased to increase the endothermic heat removal while maintaining a low oxidant stream. Therefore, costs can also be saved. The fuel utilization is defined as the ratio of the energy of the fuel stream which is converted to electric energy plus heat energy resulting from the conversion of a fuel stream to the total energy content of the fuel stream. Due to the recycling of the hydrocarbon stream high fuel utilization values of over 90% up to effectively 100% can be achieved. Thus a reduction of the degradation and increase of electric power and energy which also results in a high total efficiency of the fuel cell of about 80% are accomplished. However, it is important to note that the concentration of unconverted exhaust stream in this operation mode is higher than 0, even if the fuel utilization value is effectively 100% for avoiding the anode degradation. In other words, the stack fuel utilization value is far less than 100%, even when the system fuel utilization is effectively 100%.

In a particularly perferred embodiment, the recycled hydrocarbon obtained from the hydrocarbon recycling conduit contains less than 30 mass % $CO_2$ and less than 30 mass % $H_2O$ so that the efficiency of the inventive fuel cell system can be further improved.

In view of the above-described advantageous effect, it is further advantageous that an anode inlet of the fuel cell contains less than 30% $CO_2$.

According to another preferable embodiment, the oxidant stream of the fuel cell consists of pure oxygen. Since the heat dissipation proceeds over the reformation of hydrocarbon, pure oxygen can be used instead of diluted oxygen. Diluted oxygen has to be used in conventional fuel cells in order to provide a heat dissipation medium at the fuel cell cathode. The oxidant stream of the present invention consisting of pure oxygen further contributes to the increase of the total efficiency, since more electric energy can be produced and additionally operating costs can be saved. Furthermore, in case the oxidant stream consists of pure oxygen, more than 90% heat loss of the fuel cell system can be released in the hydrocarbon generation unit during hydrocarbon generation which leads to a higher total efficiency of the fuel cell system since a higher percentage of the heat loss can be converted into electric energy. In this respect it is further advantageous that the oxygen is provided in a stoichiometric amount for electrochemical conversion of fuel and the complete heat generated during the exothermic electrochemical reactions is consumed by endothermic reforming of the hydrocarbons.

According to a further embodiment of the inventive fuel cell system, an exhaust stream recycling conduit is connected to the anode outlet of the fuel cell and to the anode inlet of the fuel cell which is arranged to recycle at least a part of an exhaust stream from the fuel cell. Exhaust stream components, like carbon dioxide and water, which are recycled to the anode inlet increase the concentrations of the reactants of the reformation reaction (see equations (I) and (II)) which increases the concentration of hydrogen in the fuel cell. Thus, separate steam production can be avoided and also an increase of the total efficiency of the fuel cell system and a controlled heat dissipation can be provided. In a further preferred embodiment, the exhaust recycling conduit is arranged upstream to the hydrocarbon generation unit to conveniently control the fuel utilization over the percentage of the exhaust stream which is recycled prior to hydrocarbon generation and also to simply control the heat released by the hydrocarbon generation.

To provide a precise fuel cell temperature, the fuel cell system is advantageously arranged to control the fuel cell temperature over the stoichiometric amount of hydrocarbon and/or at least one reformation component according to one embodiment of the inventive fuel cell. This can for example be realized by the mass flow adjustment of the respective stream in the recycling conduit or by the mass flow adjustment of a fuel stream containing the respective components in a conduit, wherein said conduits are connected to the anode inlet of the fuel cell.

According to another preferable embodiment of the inventive fuel cell system, the separation unit comprises an adsorber, a membrane, a washer, cryogenic separation/distillation, pressure or temperature swing adsorption, or an arbitrary combination of these means. The respective components are known in the art, like amine washers, low pressure condensers, high pressure condensers, high pressure washers and other known chemical and/or and physical washers. The purity and the concentration of the hydrocarbon stream can be controlled depending on the specific separation units or the combination of specific separation units according to the purity of the hydrocarbon which is required for its further processing.

According to another embodiment of the invention, the fuel cell system is arranged to control a stoichiometric amount of a partially unconverted exhaust stream component in the hydrocarbon generation unit for controlling the heat balance of the fuel cell. The higher the concentration of the unconverted exhaust stream component, like e.g. carbon monoxide or hydrogen, in the hydrocarbon generation unit, the higher is the respective heat release at the hydrocarbon generation unit. Therefore, the heat balance of the fuel cell system can be easily controlled by those parameters. The adjustment of the concentration can be realized by known means like for example a compressor.

In another preferred embodiment of the inventive fuel cell system, the system is arranged to control a flow rate of an oxidant stream in the fuel cell to provide heat for the reformation of hydrocarbon. The flow rate can be controlled by means known in the state of the art, like e.g. a compressor. When the flow rate of an oxidant stream in the cathode of the fuel cell is low, the heat dissipation caused by said oxidant stream from the anode of the fuel cell to the outside is low. Therefore, more heat dissipation is possible over the reformation reaction of hydrocarbon in the fuel cell. If the mass flow of the oxidant is high, an increase of the heat dissipation from the anode of the fuel cell to the cathode of the fuel cell takes place and therefore less heat is available for the reformation reaction of hydrocarbon. Thus, low oxidant stream mass flows enable to support the reformation reaction of hydrocarbon and to contribute to an increased total efficiency of the fuel cell system.

In a further preferred embodiment of the inventive fuel cell system, the operating pressure of the fuel cell is above atmospheric pressure, preferably 2 to 30 bar and more preferably 5 to 15 bar above atmospheric pressure. Due to the pressurization the fuel utilization and also the total efficiency of the fuel cell system can be increased, since catalyst kinetics are improved and the equilibrium of the fuel cell reactions, like electrochemical conversion, and/or the hydrocarbon generation in the hydrocarbon generation unit are shifted to the product side, leading to an increase of the total efficiency. Furthermore, pressurization can support the efficiency of the carbon dioxide separation process. The pressurization can be achieved by conventional means known in the art.

In another advantageous embodiment of the inventive fuel cell system, a heat exchanger is connected to the anode outlet of the fuel cell upstream to the hydrocarbon generation unit.

The heat exchanger can comprise any suitable heat exchanger known in the art. The heat exchanger cools down the unconverted exhaust stream, e.g. carbon monoxide and hydrogen, prior to entering the hydrocarbon generation unit. Since the hydrocarbon generation reaction is exothermal, a shift of the equilibrium to the hydrocarbon side can be achieved, i.e. higher hydrocarbon yields are possible. Preferably, in order to provide an optimum of the hydrocarbon generation parameters, the unconverted exhaust gas stream has a temperature of about 600-850° C. after leaving the anode outlet of the fuel cell and is cooled down to 250-350° C. by the heat exchanger prior to entering the hydrocarbon generation unit.

In a further preferred embodiment, the fuel cell system includes the hydrocarbon stream recycling conduit and the exhaust stream recycling conduit. Therefore, the fuel utilization can be maximized without significant heat loss and separate steam production.

In another preferred embodiment of the fuel cell system, the hydrocarbon generation unit is connected to a steam cycle in order to convert the heat loss to electrical energy. This can be done by steam cycle known in the prior art, also including organic rankine cycles and similar. Therefore, the total efficiency of the fuel cell system can be maximized and a fuel utilization value between 85% and up to effectively 100% can be achieved. More preferably, the heat released at the hydrocarbon generation unit is used to evaporate water in the stream cycle. In an alternative preferred embodiment, the heat released at the hydrocarbon generation unit is used to heat a supercritical fluid or a supercritical fluid mixture. Thus, the heat loss can be used in a highly effective manner to increase the total efficiency of the fuel cell.

In a further preferred embodiment, the operation temperature of the fuel cell is 600 to 900° C., since the optimum of the total efficiency of the fuel cell system can be reached at this temperature range. Especially, a temperature of 700 to 800° C. is more preferred.

In a further preferred embodiment, the hydrocarbon generation unit is coupled to a heat transfer unit which is connected to a further reformer. Thus, at least a part of the heat loss is effectively used to operate said reformer.

In a preferred embodiment, the fuel cell is a SOFC, wherein the oxidant stream consists of pure oxygen or a MCFC comprising a mixture of 1:2 (oxygen to carbon dioxide) in the oxidant stream. This can be realized by conventional means. Thus, the total efficiency of the fuel cell system can be increased.

In another preferred embodiment, the fuel cell system comprises a MCFC, wherein the fuel cell system is arranged to recycle carbon dioxide to the cathode inlet of said fuel cell, e.g. via a recycling conduit. Thus, an excellent activation of the MCFC can be achieved.

In another preferred embodiment, the hydrocarbon generation unit comprises several hydrocarbon generation sub units in series wherein the exhaust stream of each of the hydrocarbon generation sub units is relaxed to provide mechanical power. This can be done by conventional means. Thus, additionally the heat loss can be partially converted into usable mechanical power.

A further preferred embodiment of the inventive fuel cell system comprises an additional Fischer-Tropsch unit connected in series or parallel to the hydrocarbon generation unit. Thus, also long chain hydrocarbons can be produced of unconverted exhaust stream components. Thus, the fuel cell system has a higher variability concerning hydrocarbons. More preferably, the fuel cell system also comprises a hydrocarbon recycling conduit from the Fischer-Tropsch unit to the anode inlet. Therefore a high variety of hydrocarbons can be recycled into the anode depending on the current demand.

In a further preferred embodiment, the inventive fuel cell system is arranged to use at least a part of the heat released in the exothermal hydrocarbon generation reaction to heat up the oxidant stream to e.g. 600° C., wherein a heat exchanger is arranged at an oxidant stream feed conduit and is thermally coupled and connected to the hydrocarbon generation unit by conventional means. The fuel cell system is further arranged to relax the heated oxidant stream, e.g. to 1 bar and 300° C., in order to produce mechanical work, wherein a gas expansion unit connected to an energy converter is arranged downstream to said heat exchanger. Furthermore, the fuel cell system is arranged to heat the oxidant stream to e.g. 700° C., wherein a further heat exchanger is thermally coupled to the heat of the exhaust gases of the fuel cell by conventional means known in the art. Preferably the oxidant stream has a pressure of 5 bar and 300° C. prior to entering said arrangement. Thus, the heat release of the fuel cell unit can be efficiently used.

In another advantageous embodiment, the fuel cell system comprises a gas storage unit for the hydrocarbon of the hydrocarbon generation unit which can be any gas storage unit known in the art. Said gas storage unit is connected to the hydrocarbon generation unit, e.g. by a conduit. Thus, the inventive fuel cell system can easily provide and store hydrocarbon if required.

In another advantageous embodiment, the fuel cell is a reversible fuel cell and can be operated in a fuel cell mode according to the fuel cell system described above and additionally an electrolysis mode where the cell produces hydrogen from steam and carbon monoxide from carbon dioxide; and produced hydrogen and carbon oxides react to form hydrocarbons and steam in the hydrocarbon generation unit (5). All reversible fuel cells known in the art are possible. The fuel cell system can also produce fuel gas from a partially unconverted exhaust stream and also switch to the operation mode to produce electricity, if required. Thus, a higher variety of the fuel cell system is possible and as well a saving of costs.

The present invention further concerns a method of operating a fuel cell system. The fuel cell system may be constituted as outlined above in regards of the inventive fuel cell system. In other words, the inventive method of operating a fuel cell system can be used to operate the inventive fuel cell system. The inventive method comprises reforming of hydrocarbon in a fuel cell. Reforming of hydrocarbon is carried out as mentioned above, i.e. by adding the respective reactant stream comprising reactants according to equations (I) and (II) and/or further hydrocarbons. Due to the endothermal reforming of hydrocarbon, fuel cell internal heat dissipation is carried out. Thus, the total efficiency of the fuel system can be increased, since no additional cooling means are necessary. Preferably, the operation temperature of the fuel cell during hydrocarbon reforming is 600-800° C.

In a second step, the inventive method comprises the recycling of a part of an exhaust stream from an anode outlet of the fuel cell to an anode inlet of the fuel cell. The recycling can be carried out by conventional means like an exhaust recycling stream conduit. Since the exhaust stream mainly contains non-combustible components like carbon dioxide and water, the reactant concentration for the reformation reaction can be controlled. This allows a good control of the fuel utilization and thermal balance and thus, a good control of the total efficiency of the fuel cell system.

A third step comprises generating the hydrocarbon from carbon monoxide and hydrogen included in a part of an exhaust stream which is a partially unconverted exhaust stream, of the anode outlet of the fuel cell to produce a hydrocarbon containing stream, wherein the hydrocarbon generation heat is decoupled from the fuel cell. Generating the hydrocarbon out of parts of the unconverted exhaust stream, including carbon monoxide and hydrogen, can be operated as mentioned above in the description of the hydrocarbon generation unit. Due to the exothermal hydrocarbon generation reaction, the unconverted exhaust stream carries a significant part of the heat loss of the fuel cell. The heat released by the exothermal hydrocarbon generation can thus be further used to increase the total efficiency of the system by e.g. conventional energy conversion means. The hydrocarbon generation is decoupled from the reformation as explained above, so that the exothermal hydrocarbon generation reaction and the endothermal reformation reaction proceed without one reaction thermally interfering the other.

In a fourth step, the produced hydrocarbon stream is recycled to the anode inlet of the fuel cell. This can be carried out by conventional means like a hydrocarbon recycling conduit. The recycling concentration is e.g. controllable by use of valves and a compressor. If the hydrocarbon concentration at the anode inlet is increased to a certain extent, the fuel utilization is also increased and vice versa. An aging of the cell can be compensated by a higher hydrocarbon concentration provided in the hydrocarbon recycling stream, depending on the individual requirements of the inventive method. Therefore, process costs can be saved and a high process variability is possible.

According to another preferred embodiment of the inventive method, the heat released during hydrocarbon generation is used for an evaporation process and/or for desorption of adsorbed substances and/or for heating purposes. Thus, a better utilization of said heat can be achieved.

The inventive method of operating the fuel cell system has several advantages. Due to the reforming reaction of hydrocarbon in the fuel cell by the recycling of a part of an exhaust stream and hydrocarbon generation of a part of an exhaust stream the total efficiency of the inventive fuel cell system can be effectively increased. Furthermore, the heat loss of the fuel cell which is essentially released during the hydrocarbon generation can be additionally used for several purposes, e.g. a simple energy conversion process downstream to the hydrocarbon generation. Furthermore, the recycling of the produced hydrocarbon stream to the anode inlet of the fuel cell provides excellent control over the aging of the cell and the increase of the total efficiency of the cell depending on the concentration. By carrying out the inventive method it is further possible to minimize the heat extraction by the oxidant stream of the fuel cell and to reach a fuel utilization of more than 95 mass % without strong fuel dilution, which means a content of less than 30 mass % carbon dioxide in the anode inlet.

Regarding additional explanations to the components of the fuel cell system, advantages and advantageous effects, reference is made to the disclosure of the above captioned inventive fuel cell system.

According to a further advantageous embodiment of the inventive method, non-combustible exhaust stream components, especially carbon dioxide and water, are separated from the hydrocarbon containing stream after step of generating the hydrocarbon by means as described above. Due to the separation a higher purity of the hydrocarbon and a better control of the reactions in the fuel cell are possible. Furthermore, $CO_2$ and $H_2O$ would enrich without the separation and the system would not further work. Herein, the same amounts of $CO_2$ and $H_2O$ as the incoming amount of carbon and hydrogen respectively have to be separated.

According to another preferable embodiment of the inventive method, the method comprises controlling the fuel cell temperature over the stoichiometric amount of hydrocarbon and/or at least one reformation component. This can be realized as described above. The electrochemical conversion and the endothermic reaction and therefore the heat dissipation of the cell and the electrochemical combustion reaction of the cell can be excellently controlled by said reactants. Besides, the method comprises controlling a stoichiometric amount of a partially unconverted exhaust stream component in the hydrocarbon generation unit for controlling the heat balance of the fuel cell system as explained above. This is e.g. possible by adjusting the percentage of the part of recycled exhaust stream by means known in the art. The total heat balance is therefore excellently controllable. Additionally, the method comprises controlling a flow rate of an oxidant in the fuel cell to adjust the heat for the reformation of hydrocarbon. As explained above, a low flow rate in the cathode does not dissipate much heat from the anode which is needed for the reformation reaction. Thus, the total efficiency can be increased.

According to another advantageous embodiment, the fuel stream feed consists of hydrogen combined with carbon dioxide in order to yield more CO in the reformation reaction. The such produced CO and unconverted hydrogen can be further converted to the hydrocarbon in the hydrocarbon generation unit. Thus, the overall heat balance can be controlled more effectively by the hydrocarbon generation unit.

To further improve the heat efficiency of the fuel cell system, the method may be characterized in that the heat released from the hydrocarbon generation unit is extracted from the fuel cell system, in particular via evaporation.

In order to further improve the fuel efficiency of the fuel cell system, it is advantageous that the complete exhaust stream of the fuel cell is fed into the hydrocarbon generation unit.

According to a further preferred embodiment the exhaust stream of the anode is converted to hydrocarbon without prior mixing with other streams, whereby the structure of the fuel cell system and thus, the method for operating the same can be facilitated.

The fuel efficiency of the fuel cell system can be further improved by the embodiment, where more than 80 mass % of the residual hydrogen and carbon monoxide included in the partially unconverted exhaust stream of the anode outlet are converted to hydrocarbon in the hydrocarbon generation unit and/or wherein the hydrocarbon generation unit inlet contains less than 10% methane.

In view of the reducing the complexity of the method for operating a fuel cell, it is advantageous that no part of the exhaust of the fuel cell is oxidized and no residual fuel is vented to the atmosphere.

In order to further improve the thermal efficiency of the method for operating a fuel cell system, it is further advantageous that at least 50% of the heat generated during the exothermic fuel cell operation is consumed by the endothermic reformation of hydrocarbon and subsequently released during the exothermic reaction in the hydrocarbon generation unit.

It is still further advantageous when the overall effective fuel utilization reaches up to 95-100%.

The present invention further concerns a use of the inventive fuel cell system in a power plant. Therefore, the total efficiency and fuel utilization of a power plant can be increased significantly.

Figure 2:
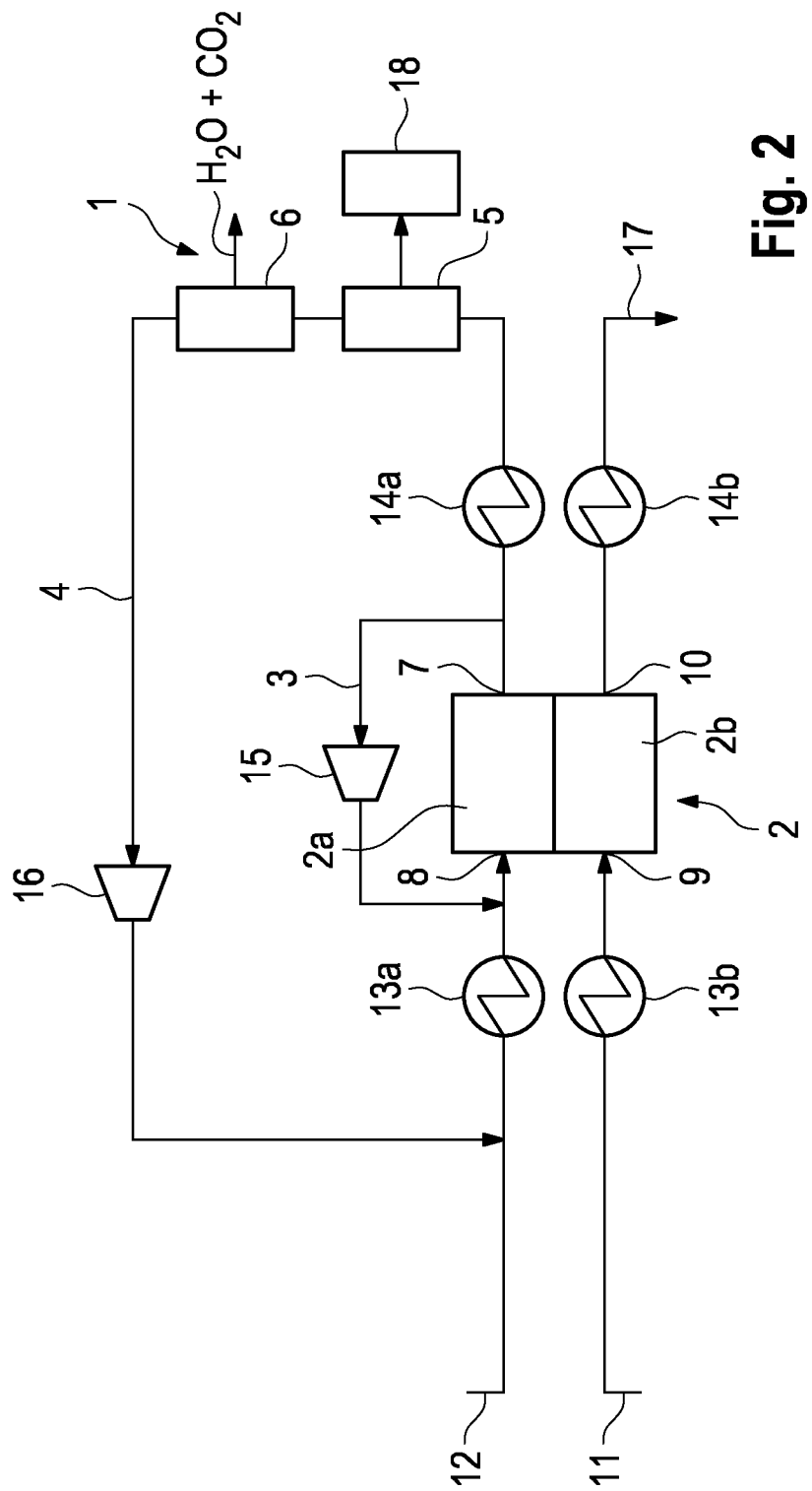
Figure 3:
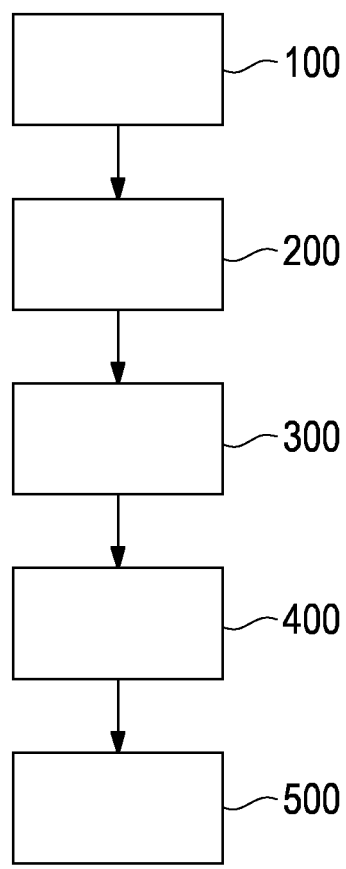

Further details, advantages and characteristics of the present invention will be explained with respect to the following description of the embodiments in light of the Figures. The Figures show:

FIG. 1 a schematic diagram of a fuel cell system according to one embodiment,

FIG. 2 a schematic diagram of a fuel cell system according to another embodiment FIG. 3 a schematic diagram of a method of operating a fuel cell system according to an embodiment.

The present invention is described with reference to the following Figures. Herein, all essential elements and components of the inventive fuel cell are shown. All other elements and components have been omitted to increase the understanding of the present invention.

In detail, FIG. 1 shows a schematic diagram of a fuel cell system 1 according to one embodiment of the present invention. The fuel cell system 1 comprises a fuel cell 2 including an anode 2a and a cathode 2b. The materials of the fuel cell 2, e.g. catalysts, membranes, electrolytes comprise those known in the art. The fuel cell 2 is arranged to convert an oxidant stream entering and a fuel stream entering the fuel cell 2 to produce electrical power by an electrochemical combustion reaction of the fuel stream which is oxidized by the oxidant stream. The operation temperature of the fuel cell is preferably 600-800° C.

The cathode 2b of the fuel cell 2 comprises a cathode inlet 9 into which an oxidant stream, consisting of air or pure oxygen, is introduced. In case of pure oxygen reactant, the total efficiency of the fuel cell can be increased, since more electric energy is generated. The oxidant stream is introduced into the oxidant stream feed conduit 11 for example by a gas storage tank or by a gas liquefaction unit or in case of air as oxidant simply the environment. The pressure and the mass flow of the oxidant stream can be adjusted by e.g. a compressor or a turbine upstream to the oxidant stream feed conduit 11. A heat exchanger 13b can be used to heat the air or pure oxygen stream to the operating temperature of the fuel cell 2, wherein any type of suitable heat exchanger of the prior art can be used. The cathode 2b further comprises a cathode outlet 10 through which in the case of air the oxygen reduced oxidant exhaust stream exits the fuel cell 2 via oxidant stream outlet 17. Additionally, a heat exchanger 14b is arranged downstream of the cathode outlet 10 to cool the oxidant exhaust stream. The heat transferred at heat exchanger 14b can be further efficiently used for the fuel cell system 1, for example to heat the incoming oxidant stream in heat exchanger 13b.

The anode 2a of the fuel cell 2 comprises an anode inlet 8 in which a fuel stream can be introduced. The fuel stream can comprise e.g. natural gas, synthesis gas, carbon monoxide, hydrogen, methanol, ethanol, acetic acid, formaldehyde, methane, ethane, propane or an arbitrary combination thereof and further substances suitable for fuel cells known in the art. The fuel stream is introduced into the fuel cell system 1 over the fuel stream feed conduit 12. Fuel stream feed conduit 12 can be connected to e.g. a gas tank, biogas producing unit, a gas pipeline or another industrial operating unit producing fuel gas or to other suitable means known in the art. The mass flow and the pressure of the fuel stream feed can be controlled for example by a compressor, a mass flow controller or a turbine or any other technical means known in the prior art. The heat exchanger 13a preheats the fuel stream to the operation temperature of the fuel cell, e.g. 800° C. The anode exhaust stream exits the anode 2a via an anode outlet 7. A heat exchanger 14a is arranged downstream to the anode 2a to cool down a partially unconverted exhaust stream, as defined above, to e.g. 350° C. Depending of the type of exhaust stream component, the exhaust stream is further processed as explained in detail below. Due to this set-up, a good fuel cell internal/local fuel utilization of e.g. 50% can be achieved. That value is especially advantageous when the aging of the anode 2a has to be avoided and a long time on stream of the electrodes is required.

Furthermore, the fuel cell 2 is arranged for a reformation reaction of hydrocarbon in order to dissipate the heat produced during the operation of the fuel cell 2. The endothermal reformation proceeds via the pathways according to equations (I) and (II). Thus, hydrocarbon can be provided via a hydrocarbon stream recycling conduit 4 as explained below and/or via the fuel stream feed conduit 12. The other reactants, e.g. carbon dioxide and water, are supplied over an exhaust stream, which additionally comprises unconverted exhaust components like carbon monoxide and hydrogen, exiting the anode outlet 7 via an exhaust stream recycling conduit 3, connected to the anode outlet 7, arranged upstream to the hydrocarbon generation unit 5 and the heat exchanger 14a and reentering the fuel cell 2 by the anode inlet 8. The amount of the recycled exhaust stream can be varied in order to control the reformation reaction in the fuel cell 2. Such recycling is for example possible over valves (not shown here) and a compressor 15. The reformation reaction provides a heat sink in the fuel cell 2 and no additional cooling means are necessary for the fuel cell 2. Hence, due to the exhaust stream recycling, a good fuel utilization of up to 70% is possible with very low degradation of the fuel cell 2 and an increase of the total efficiency of the fuel cell system 1.

The fuel cell system 1 further comprises a hydrocarbon generation unit 5 which converts unconverted exhaust stream, e.g. carbon monoxide and hydrogen, to hydrocarbon. Upstream to the hydrocarbon generation unit, heat exchanger 14a is arranged which cools the exhaust stream for the hydrocarbon generation unit 5 to e.g. 350° C. Thus, good hydrocarbon yields can be produced, since the equilibrium is shifted to the hydrocarbon side. Any hydrocarbon generation unit 5 known can be used. Due to the reformation reaction in the fuel cell 2 a high percentage of the heat loss of the fuel cell system 1 is stored in the reactants for the hydrocarbon generation unit 5. The exothermal hydrocarbon generation reaction in hydrocarbon generation unit 5 releases the heat which can be additionally used to increase the efficiency as explained below. The hydrocarbon produced by the hydrocarbon generation unit 5 is introduced into at least one separation unit 6 which comprises a membrane, a washer, an adsorber or an arbitrary combination thereof to separate non-combustible components, especially carbon dioxide and water. Due to the separation unit 6, a hydrocarbon stream with a good purity can be sent back into the anode inlet 8 over a hydrocarbon stream recycling conduit 4 and after passing a heat exchanger 13a, to preheat the hydrocarbon to the reaction temperature of e.g. 800° C. The concentration of the hydrocarbon in the hydrocarbon recycling stream and its pressure can be easily controlled e.g. by a compressor 16. Due to the hydrocarbon stream recycling over the hydrocarbon stream recycling conduit 4 a fuel utilization of 100% can be achieved without degradation of the anode 2a material, since hydrogen is always supplied by the reformation reaction and even at the anode outlet 7 sufficient residual fuel is available. Since no additional cooling is required a high total efficiency of the fuel cell 2 of up to 80% is be achieved. The hydrocarbon generation unit 5 is thermally decoupled from the fuel cell 2 which provides a better thermal balance of the fuel cell system 1.

Furthermore the fuel cell system 1 is arranged to control the fuel cell 2 temperature by the stoichiometric amount of hydrocarbon and/or at least one reformation component. This is for example possible by the mass flow or the pressure of the hydrocarbon stream introduced over the fuel stream feed 12 or over the hydrocarbon recycling conduit 4 and/or the mass flow of the exhaust stream recycling conduit 3. Said mass flows can be easily controlled by known technical means like compressors of the hydrocarbon recycling conduit 16 and/or the exhaust stream recycling conduit 15 and other suitable technical means not shown here. The higher the mass flow of said reactants, the more endotherm is the reformation reaction. Thus, the heat dissipation of the fuel cell 2 can be easily controlled.

The fuel cell system 1 is also arranged to control a stoichiometric amount of a partially unconverted exhaust gas stream component in the hydrocarbon generation unit 5 for controlling the heat balance of the fuel cell system 1. The higher the amount of the unconverted exhaust stream in the hydrocarbon generation unit 5, the higher is the energy released by the hydrocarbon generation unit 5. Said amount can for example be adjusted by its mass flow or its pressure by means known in the art. Thus, the heat released by the hydrocarbon generation unit 5 can be controlled easily.

The fuel cell system 1 is also arranged to control a flow rate of an oxidant stream in the fuel cell 2 to provide heat for the reformation of hydrocarbon. The lower the flow rate of the oxidant stream, the more heat is available for the reformation of hydrocarbon. Thus, operating costs can be saved and the total efficiency of the fuel cell system 1 can be increased.

The operating pressure of the fuel cell system 1 can be above atmospheric pressure, preferably 2 to 30 bar and more preferably 5 to 15 bar above atmospheric pressure, which contributes to the total efficiency of the fuel cell system 1 by shifting the equilibrium of the hydrocarbon generation reaction in the hydrocarbon generation unit 5 to the product side and improving the separation efficiency for $CO_2$ and $H_2O$.

FIG. 2 is a schematic diagram of a fuel cell system 1 according to another embodiment of the present invention, which comprises the features of FIG. 1. However, additionally to the embodiment shown in FIG. 1, an energy converter 18, like e.g. a steam circuit, is coupled and connected to the hydrocarbon generation unit 5, wherein the heat released by the exothermal hydrocarbon generation reaction is further converted to electric energy. Thus, an excellent total efficiency of the fuel cell system 1 of over 80% is achieved.

Altogether a fuel cell system 1 with decreased operation costs, and a high total efficiency of over 80% can be provided. The total heat balance of the fuel cell 2 can also be easily controlled. Furthermore, the fuel cell system 1 can be operated at a high fuel utilization of up to 100% without increased degradation of the anode 2a material of the fuel cell 2.

In detail, FIG. 3 provides an overview of the inventive method of running a fuel cell system 1 according to an embodiment of the inventive method. In a first step 100, the method provides reforming of hydrocarbon in a fuel cell 2. Due to this endothermal reaction, a heat sink in the fuel cell 2 can be provided which increases the total efficiency of the inventive fuel cell system 1. The hydrocarbon reforming is carried out under the typical fuel cell operating temperature, i.e. 800° C. Reactants according to equations (I) or (II) can be fed into the anode inlet 8 as described above. During reforming of hydrocarbon, a high percentage of the heat loss of the fuel cell 2 is stored in the reformation products exiting the fuel cell 2. For example, the reformation reactants can be introduced over the fuel stream feed conduit 12 and/or the exhaust stream recycling conduit 3 and/or the hydrocarbon stream recycling conduit 4. The respective mass flow of each stream and therefore the equilibrium of the reformation reaction can be adjusted by known technical means like e.g. compressors 14 and 15.

In a second step 200, a part of the exhaust stream is recycled from an anode outlet 7 of to fuel cell 2 to the anode inlet 8 of the fuel cell 2. Thus, reactants for the reformation reaction, like carbon dioxide and water are provided. The temperature of the fuel cell 2 can be easily controlled by the stoichiometric amount of the exhaust recycling stream components. Thus on the one hand non-combustible waste products can be efficiently used and on the other hand, the fuel utilization of the fuel cell 2 and therefore the total efficiency of the fuel cell system 1 are increased.

In a third step 300, a part of the exhaust stream from the anode outlet 7 of the fuel cell 2 is converted into the hydrocarbon to produce a hydrocarbon containing stream, wherein the hydrocarbon generation heat is thermally decoupled from the fuel cell 2. Generating the hydrocarbon is carried out in the hydrocarbon generation unit 5. The hydrocarbon generation heat is decoupled from the fuel cell 2 since hydrocarbon generation is an exothermal process. An interference between the hydrocarbon generation and the reformation process is thereby effectively avoided. Thus, the heat resulting from generating the hydrocarbon out of a part of the exhaust stream, namely unconverted exhaust stream components, can be further used for operating additional technical units or to convert the heat release into further electric energy, thus providing a high total efficiency.

In a fourth step 400, non-combustible exhaust stream components, especially carbon dioxide and water are separated from the hydrocarbon containing stream exiting the hydrocarbon generation unit 5 after step 300. Separating said exhaust stream components can be carried out by means like a washer, an adsorber, a membrane or an arbitrary combination thereof. Thus, a hydrocarbon of high purity can be provided for further processing.

The fifth step 500 comprises the recycling of the hydrocarbon stream produced during the previous step to the anode inlet 8 of the fuel cell 2. The fuel utilization is increased to values up to 100% and the total efficiency of the fuel cell system 1 is increased to values of 80%. Due to the use of hydrocarbon, the equilibrium and therefore the thermal balance of the reformation reaction can be effectively controlled. Recycling of hydrocarbon can also control the heat of the endothermal reformation reaction in the first step 100.

During the inventive method of operating, the inventive fuel cell system 1, oxidant streams with lower mass flows can be used in order to provide an excellent controllability of the thermal heat balance of the fuel cell 2. Since low oxidant streams can be applied to the cathode 2b of the fuel cell 2, more heat is available for the reformation reaction. The heat, used for the reformation reaction is stored in the reformation products and can be further used for generating electric energy, i.e. by combustion steam cycle or by heat release followed by heat conversion after the hydrocarbon generation unit 5.

Accordingly, the inventive process enables an operation of the inventive fuel cell system 1 with a high total efficiency and an excellent controllability of the thermal heat balance of the fuel cell 2.

While embodiments of the invention have been illustrated and described, it is not intended that these embodiments illustrate and describe all possible form of the invention. The words used in the specification are words of description rather than limitation, and it is understood that various changes may be made without departing from the spirit and the scope of the invention.

REFERENCE SIGNS 1 fuel cell system
2 fuel cell
2a anode
2b cathode
3 exhaust stream recycling conduit 4 hydrocarbon stream recycling conduit
5 hydrocarbon generation unit
6 separation unit
7 anode outlet
7 anode inlet
8 cathode inlet
9 cathode outlet
10 oxidant stream feed conduit
12 fuel stream feed conduit
13a heat exchanger
13b heat exchanger
14a heat exchanger
14b heat exchanger
15 compressor
16 compressor
17 oxidant stream exhaust conduit
18 steam circuit
100 step of a method
200 step of a method
300 step of a method
400 step of a method
500 step of a method

The invention claimed is:

1. A fuel cell system comprising at least one fuel cell arranged for a reformation of a hydrocarbon and a hydrocarbon generation unit connected to an anode outlet of the fuel cell for generating the hydrocarbon from carbon monoxide and hydrogen included in an exhaust stream of the anode outlet of the fuel cell, wherein the fuel cell is thermally decoupled from the hydrocarbon generation unit so that an exothermal hydrocarbon generation reaction that occurs in the hydrocarbon generation unit and an endothermal reformation reaction that occurs in the fuel cell proceed without one reaction directly thermally interfering the other,
  wherein the fuel cell system is arranged to control a stoichiometric amount of an electrochemically unconverted or partially converted component of the exhaust stream in the hydrocarbon generation unit for controlling a heat balance of the fuel cell,
  wherein the higher the amount of the electrochemically unconverted or partially converted component of the exhaust stream in the hydrocarbon generation unit, the higher the energy released by the hydrocarbon generation unit, and
  wherein the amount of the electrochemically unconverted or partially converted component of the exhaust stream is adjusted by its mass flow or its pressure, to control the heat released by the hydrocarbon generation unit.

2. The fuel cell system of claim 1, wherein the hydrocarbon is methane and the hydrocarbon generating unit is a methanation unit.

3. The fuel cell system of claim 1, further comprising a further separation unit, arranged downstream to the hydrocarbon generation unit and connected thereto to separate water from the exhaust stream.

4. The fuel cell system according to claim 1, wherein the hydrocarbon generation unit is connected to a hydrocarbon recycling conduit which is connected to an anode inlet of the fuel cell.

5. The fuel cell system according to claim 4, wherein the recycled hydrocarbon obtained from the hydrocarbon recycling conduit contains less than 30 mass % $CO_2$ and less than 30 mass % $H_2O$.

6. The fuel cell system according to claim 1, wherein an anode inlet of the fuel cell contains less than 30% $CO_2$, or wherein an oxidant stream of the fuel cell consists of pure oxygen, and the oxygen is provided in a stoichiometric amount for electrochemical conversion of fuel and the complete heat generated during the exothermic electrochemical reactions is consumed by endothermic reforming of the hydrocarbons.

7. The fuel cell system according to claim 1, wherein an exhaust stream recycling conduit is connected to the anode outlet of the fuel cell and to an anode inlet of the fuel cell, wherein the exhaust stream recycling conduit is arranged to recycle at least a part of an exhaust stream from the fuel cell, and/or
  wherein the fuel cell system is arranged to control the fuel cell temperature over a stoichiometric amount of recycled hydrocarbon and/or at least one reformation component, and/or
  wherein the at least one separation unit comprises a membrane, a washer, an adsorber, cryogenic separation/distillation, pressure/temperature swing adsorption, or an arbitrary combination thereof, and/or
  wherein the fuel cell system is arranged to control a flow rate of an oxidant stream in the fuel cell to provide heat for the reformation of the hydrocarbon.

8. The fuel cell system according to claim 7, wherein said exhaust stream recycling conduit is arranged upstream to the hydrocarbon generation unit, wherein in particular, the fuel cell system is arranged to control the fuel cell temperature over a stoichiometric amount of recycled hydrocarbon and/or at least one reformation component.

9. The fuel cell system according to claim 1, wherein an operating pressure of the fuel cell system is above atmospheric pressure, wherein in particular, the operating pressure of the fuel cell system is 2 to 30 bar and more particular 5 to 15 bar above atmospheric pressure.

10. The fuel cell system according to claim 1, wherein a heat exchanger is connected to the anode outlet of the fuel cell upstream to the hydrocarbon generation unit.

11. The fuel cell system according to claim 1, wherein heat released during hydrocarbon generation is used for an evaporation process and/or for desorption of adsorbed substances and/or for heating purposes.

12. The fuel cell system according to claim 1, wherein the fuel cell is a reversible fuel cell that can be operated in a fuel cell mode and additionally in an electrolysis mode.

13. A method of operating a fuel cell system according to claim 1, comprising:
  a) reforming of hydrocarbon in a fuel cell via an exhaust stream recycling conduit;
  b) recycling of a part of an exhaust stream from an anode outlet of the fuel cell to an anode inlet of the fuel cell;
  c) generating a hydrocarbon from carbon monoxide and hydrogen included in an electrochemically partially unconverted exhaust stream of the anode outlet of the fuel cell in a hydrocarbon generation unit to produce a hydrocarbon containing stream, wherein heat of the hydrocarbon generation is decoupled from the fuel cell so that an exothermal hydrocarbon generation reaction and an endothermal reformation reaction proceed without one reaction directly thermally interfering the other; and
  d) recycling of the produced hydrocarbon stream to the anode inlet of the fuel cell, in particular via a hydrocarbon recycling conduit,
  wherein the method further comprises controlling a stoichiometric amount of an electrochemically partially unconverted exhaust stream component in the hydrocarbon generation unit for controlling a heat balance of the fuel cell system, wherein the higher the amount of the electrochemically unconverted or partially converted component of the exhaust stream in the hydrocarbon generation unit, the higher the energy released by the hydrocarbon generation unit, and wherein the amount of the electrochemically unconverted or partially converted component of the exhaust stream is adjusted by its mass flow or its pressure, to control the heat released by the hydrocarbon generation unit.

14. The method of claim 13, wherein the method further comprises controlling the fuel cell temperature over a stoichiometric amount of hydrocarbon and/or at least one reformation component or wherein the method further comprises controlling a flow rate of an oxidant stream in the fuel cell to provide heat for the reformation of the hydrocarbon, and/or wherein heat released from the hydrocarbon generation unit is extracted from the fuel cell system, and/or wherein a complete exhaust stream of the anode outlet of the fuel cell is fed into the hydrocarbon generation unit, and/or wherein the exhaust stream of the anode is converted to hydrocarbon without prior mixing with other streams, and/or wherein more than 80 mass % of residual hydrogen and carbon monoxide included in a partially unconverted exhaust stream of the anode outlet are converted to hydrocarbon in the hydrocarbon generation unit, and/or wherein the hydrocarbon generation unit inlet contains less than 10% methane, and/or wherein no exhaust is oxidized and wherein no residual fuel is vented to the atmosphere, and/or wherein at least 50% of heat generated during the exothermic fuel cell operation is consumed by endothermic reformation of hydrocarbon and subsequently released during an exothermic reaction in the hydrocarbon generation unit, and/or wherein an overall effective fuel utilization reaches up to 95-100%, and/or wherein non-combustible exhaust stream components including carbon dioxide are separated from the hydrocarbon containing stream after step c).

15. The fuel cell system according to claim 6, wherein the oxidant stream of the fuel cell consists of pure oxygen, and the oxygen is provided in a stoichiometric amount for electrochemical conversion of fuel and the complete heat generated during the exothermic electrochemical reactions is consumed by endothermic reforming of the hydrocarbons.

16. The method of claim 14, wherein the non-combustible exhaust stream components further include water.

17. The method of claim 14, wherein the heat released from the hydrocarbon generation unit is extracted from the fuel cell system via evaporation.

18. The fuel cell system according to claim 1, wherein at least one separation unit is arranged downstream to the hydrocarbon generation unit and connected thereto to separate carbon dioxide from the exhaust stream.

19. The fuel cell system according to claim 1, wherein the unconverted or partially converted component of the exhaust stream is selected among carbon monoxide, hydrogen, methane, ethane, propane or other hydrocarbons, methanol and ethanol and other long chain alcohols or a combination thereof, acetic acid or formaldehyde.

20. A fuel cell system comprising at least one fuel cell arranged for a reformation of a hydrocarbon and a hydrocarbon generation unit connected to an anode outlet of the fuel cell for generating the hydrocarbon from carbon monoxide and hydrogen included in an electrochemically partially unconverted exhaust stream of the anode outlet of the fuel cell, wherein the fuel cell is directly thermally decoupled from the hydrocarbon generation unit so that an exothermal hydrocarbon generation reaction that occurs in the hydrocarbon generation unit and an endothermal reformation reaction that occurs in the fuel cell proceed without one reaction thermally interfering the other, wherein the fuel cell system is arranged to control a stoichiometric amount of an electrochemically partially unconverted exhaust stream component in the hydrocarbon generation unit for controlling a heat balance of the fuel cell, wherein the higher the amount of the electrochemically unconverted or partially converted component of the exhaust stream in the hydrocarbon generation unit, the higher the energy released by the hydrocarbon generation unit, wherein the amount of the electrochemically unconverted or partially converted component of the exhaust stream is adjusted by its mass flow or its pressure, to control the heat released by the hydrocarbon generation unit, and wherein the hydrocarbon generation unit is connected to a hydrocarbon recycling conduit which is connected to an anode inlet of the fuel cell.

* * * * *